US012299361B2

(12) United States Patent
Yu et al.

(10) Patent No.: US 12,299,361 B2
(45) Date of Patent: May 13, 2025

(54) METHOD FOR FITTING MODES OF TRAFFIC FLOW BASED ON QUANTUM WALK

(71) Applicant: NANJING NORMAL UNIVERSITY, Jiangsu (CN)

(72) Inventors: Zhaoyuan Yu, Jiangsu (CN); Xu Hu, Jiangsu (CN); Zengjie Wang, Jiangsu (CN); Linwang Yuan, Jiangsu (CN); Wen Luo, Jiangsu (CN)

(73) Assignee: NANJING NORMAL UNIVERSITY, Jiangsu (CN)

( * ) Notice: Subject to any disclaimer, the term of this patent is extended or adjusted under 35 U.S.C. 154(b) by 864 days.

(21) Appl. No.: 17/607,902

(22) PCT Filed: Nov. 20, 2020

(86) PCT No.: PCT/CN2020/130414
§ 371 (c)(1),
(2) Date: Nov. 1, 2021

(87) PCT Pub. No.: WO2022/104696
PCT Pub. Date: May 27, 2022

(65) Prior Publication Data
US 2022/0300678 A1 Sep. 22, 2022

(30) Foreign Application Priority Data

Nov. 19, 2020 (CN) .......................... 202011301012.X (51) Int. Cl.
*G06F 30/20* (2020.01)
*G08G 1/01* (2006.01)
*G06F 111/10* (2020.01)

(52) U.S. Cl.
CPC ........... *G06F 30/20* (2020.01); *G08G 1/0125* (2013.01); *G06F 2111/10* (2020.01)

(58) Field of Classification Search
CPC ...... G06F 30/20; G06F 2111/10; G06F 30/15; G06F 30/18; G06F 30/13; G06F 30/27; G08G 1/0125; G08G 1/0129
See application file for complete search history.

(56) References Cited

FOREIGN PATENT DOCUMENTS

CN 107832663 3/2018
CN 109002856 A * 12/2018 ............... G06K 9/62
(Continued)

OTHER PUBLICATIONS

Sunderrajan A, Viswanathan V, Cai W, Knoll A. Data driven Adaptive Traffic simulation of an expressway. In2016 Winter Simulation Conference (WSC) Dec. 11, 2016 (pp. 1194-1205). IEEE. (Year: 2016).*

(Continued)

*Primary Examiner* — Chuen-Meei Gan
(74) *Attorney, Agent, or Firm* — JCIP GLOBAL INC.

(57) ABSTRACT

The present invention discloses a method for fitting modes of a traffic flow based on a quantum walk, including: (1) constructing a mode generator based on the quantum walk; (2) preparing multiple modes; (3) screening the modes; and (4) constructing a mapping mechanism between the modes and the traffic volume. The present invention takes the expressway traffic flow as a complex geographic spatial-temporal process formed by aliasing and coupling of a plurality of traffic modes with different structures, and attempts to realize modeling and simulation of the traffic flow from a multi-scale analysis view. Specifically, under a basic framework of an expressway network topological structure, all possible traffic modes in the expressway traffic flow are generated using quantum walks; and under the constraints of the observed traffic volume time series, the modes are screened based on a specific screening rule.

4 Claims, 5 Drawing Sheets

(56) References Cited

FOREIGN PATENT DOCUMENTS

| | | | | |
|---|---|---|---|---|
| CN | 111126611 | 5/2020 | | |
| CN | 111260118 | 6/2020 | | |
| JP | 2004-118735 A * | 4/2004 | ............... | G08G 1/00 |
| WO | 2017143195 | 8/2017 | | |

OTHER PUBLICATIONS

Kucuk et al Improved Simulation of Quantum Random Walks, 20054. SCIS 2005, LNCS 3733, pp. 937-946, 2005. Springer-Verlag Berlin Heidelberg (Year: 2005).*

"International Search Report (Form PCT/ISA/210) of PCT/CN2020/130414," mailed on Aug. 20, 2021, pp. 1-5.

"Written Opinion of the International Searching Authority (Form PCT/ISA/237) of PCT/CN2020/130414," mailed on Aug. 20, 2021, pp. 1-3.

* cited by examiner

METHOD FOR FITTING MODES OF TRAFFIC FLOW BASED ON QUANTUM WALK

CROSS-REFERENCE TO RELATED APPLICATION

This application is a 371 of international application of PCT application serial no. PCT/CN2020/130414, filed on Nov. 20, 2020, which claims the priority benefit of China application no. 202011301012.X, filed on Nov. 19, 2020. The entirety of each of the above mentioned patent applications is hereby incorporated by reference herein and made a part of this specification.

TECHNICAL FIELD

The present invention relates to the technical fields of urban planning and traffic geography, and particularly to a method for fitting modes of a traffic flow based on a quantum walk.

BACKGROUND

Traffic volume is an important indicator of many traffic applications and is typically acquired by sensors located at entry/exit stations of roads (expressways). Traffic volume provides key information in the aspects of identifying traffic congestion, traffic diversion, post-processing of traffic accidents and the like, and it plays an indispensable role in the fields of traffic management, volume prediction, regulation and the like. However, the traffic flow system is an open system, in which different drivers have different driving patterns. The heterogeneity of the drivers greatly increases the complexity of the traffic flow, thereby bringing a great challenge to the modeling and simulation of the traffic volume.

Current traffic modeling models can be broadly divided into two types: a deterministic model and a stochastic model. The output result of the deterministic model is completely determined by model parameters and initialization conditions, so that the traffic flow can be modeled accurately. The deterministic model can be further classified into three types: a macroscopic model, a microscopic model and an agent-based model. The macroscopic model typically uses endogenous or exogenous variables to reflect average oscillation in traffic flow, but ignores the heterogeneity of drivers, which is thereby not suitable for expressway traffic modeling. The microscopic model abstracts each driver as indistinguishable particle, and approximately describe the oscillation of traffic volumes by varying the attractiveness of the particles. However, these models can hardly show the stochastic characteristics of traffic oscillations. The agent-based model considers the heterogeneity of drivers by giving the agent predefined evolution rules or targets to evolve the agent autonomously. These predefined rules can only be used to model traffic volumes from the perspective of certainty rather than stochasticity.

The stochastic model comprises a macroscopic statistical model, a statistical learning model and a dynamic network model. The macroscopic statistical model, such as autoregressive integrated moving average model (ARIMA) and Markov models, treats the traffic flow as a stochastic process, and such models, although simple in parameter and efficient in calculations, generally require the traffic condition to be at an equilibrium state or to meet the stationary assumption; the statistical learning model, such as a Long Short-Term Memory (LSTM) network, trains the model using massive amounts of historical data and continuously adjusts model parameters to simulate the traffic volume. Such models have the advantage of identifying the nonlinear characteristics of traffic system, but pose certain limitations to the simulation of traffic flow due to the "black box" nature and oversensitivity to training data. The dynamic network model describes the spatial-temporal process of driving in manner of the dynamic transfer of drivers in the traffic network, and the heterogeneity of the driver is expressed by transition probability. In recent years, with continuous accumulation and refinement of traffic observation data, more and more evidences show that classical random walks can capture the nonlinearity and non-stationary characteristics of traffic system. However, the independence and randomness assumptions of classical random walk cannot be satisfied in most cases of real traffic flow, so that the classical random walk fails in traffic flow simulation.

SUMMARY

The technical problem to be solved herein is to provide a method for fitting modes of a traffic flow based on a quantum walk so as to realize modeling and simulation of an expressway traffic flow.

To solve the above technical problem, the present invention provides a method for fitting modes of a traffic flow based on a quantum walk, comprising:

(1) constructing a mode generator based on the quantum walk;

(2) preparing multiple modes;

(3) screening the modes; and (4) constructing a mapping mechanism between the modes and the traffic volume.

Preferably, the constructing a mode generator based on the quantum walk in the step (1) is specifically as follows: based on a basic assumption of the quantum walk, all possible selections of a driver are defined as ground states of the quantum walk in a one-dimensional traffic flow with n stations, which are recorded as $|v\rangle = \{|1\rangle, |2\rangle, \ldots, |n\rangle \}$; since the driver can only select one station to drive off from the expressway traffic flow, the ground states are expressed as the following vector form:

$$|1\rangle = \begin{pmatrix} 1 \\ 0 \\ \vdots \\ 0 \end{pmatrix}, |2\rangle = \begin{pmatrix} 0 \\ 1 \\ \vdots \\ 0 \end{pmatrix}, \ldots, |n\rangle = \begin{pmatrix} 0 \\ 0 \\ \vdots \\ 1 \end{pmatrix} \qquad (1)$$

in order to allow the driver to dynamically adjust the probability of the occurrence in different stations, a Hilbert space H formed by the ground states is defined firstly, so that a superposition state formed by linear combination of the ground states is also in the space; thus, a state of the quantum walk $|\varphi(k)\rangle$ is defined as a linear superposition of all the ground states:

$$|\varphi(k)\rangle = \Sigma_{j=1}^{n} a_j(k)|j\rangle \qquad (2)$$

wherein $|a_j(k)| \in [0,1]$ represents a probability amplitude of a driver being in a state j) at a given time; according to randomness assumption, evolution of the state vector $|\varphi(k)\rangle$ over time based on unitary transformation is represented as follows:

$$\frac{d}{dt}|\varphi(k)\rangle = iA|\varphi(k)\rangle \qquad (3)$$

as shown in formula (3), the dynamic evolution of the state vector depends on an adjacent matrix A, the state vector is converted to a matrix from a discrete point view, and the state vector is effectively solved through matrix operation, thereby constructing the mode generator based on the quantum walk.

Preferably, the preparing multiple modes in the step (2) is specifically as follows: a control parameter of the quantum walk is the only parameter of the mode generator constructed in the step (1), which directly determines characteristics of traffic modes, namely structural characteristics of corresponding probability distribution; all possible modes in the traffic flow can be generated only by continuously changing the control parameter of the quantum walk.

Preferably, the screening the modes in the step (3) is specifically as follows: taking a stepwise regression subset screening method as a traffic mode screening method, and under the constraint of a observed traffic volume time series F, stepwise regression subset screening is performed on all possible traffic modes ($|\varphi(k_1)\rangle$, $|\varphi(k_2)\rangle$, ..., $|\varphi(k_n)\rangle$) generated in the step (2), and is expressed as follows:

$$F \sim \text{stepwize}(|\varphi(k_n)\rangle) F \sim \text{stepwize}(\Sigma_{n=1}^{N} |\varphi(k_n)\rangle) \qquad (4)$$

based on Akaike information criterion (AIC), all the possible traffic modes ($|\varphi(k_1)\rangle$, $|\varphi(k_2)\rangle$, ..., $|\varphi(k_n)\rangle$) are screened using the stepwise regression subset screening method in formula (4) to obtain a mode screening result, which is recorded as $\{|\varphi(k_m)\rangle\}$.

Preferably, the constructing a mapping mechanism between the modes and the traffic volume in the step (4) is specifically as follows: based on the screened mode $\{|\varphi(k_m)\rangle\}$ obtained in the step (3), an aliasing coupling relation between the traffic volume and the traffic mode is established, and is expressed as follows:

$$F = \Sigma_{m=1}^{M} \alpha_m \times \{|\varphi(k_m)\rangle\} \qquad (5)$$

wherein M is a number of the modes obtained by screening in the step (3), F is a observed traffic volume time series, $\alpha_m$ is a total number of vehicles driving off from the expressway traffic flow in the mode $\{|\varphi(k_m)\rangle\}$, and $k_m$ is a parameter of the screened mode and is an important characteristic parameter of the traffic mode characteristics.

Beneficial effects: The present invention takes the expressway traffic flow as a complex geographic spatial-temporal process formed by aliasing and coupling of a plurality of traffic modes with different structures, and attempts to realize modeling and simulation of the traffic flow from a multi-scale analysis view. Specifically, under a basic framework of an expressway network topological structure, all possible traffic modes in the expressway traffic flow are generated using quantum walks; under the constraints of the observed traffic volume time series, the modes are screened based on a specific screening rule, and a conversion coupling mechanism between the traffic modes and the traffic volume is explored, thereby realizing the modeling and simulation of the expressway traffic flow.

DETAILED DESCRIPTION

Figure 1:
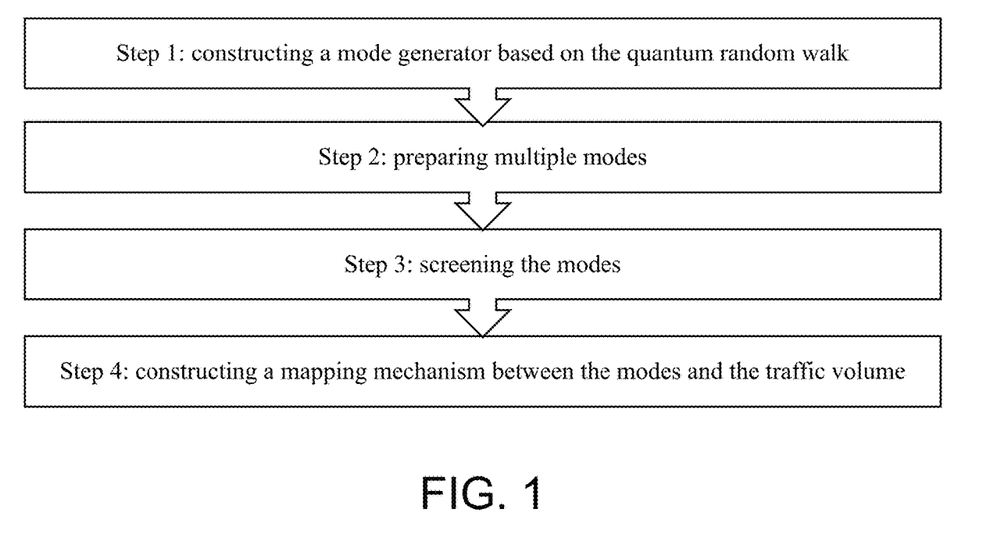
FIG. 1 is a schematic diagram of a procedure of the method according to the present invention.

As shown in FIG. 1, provided is a method for fitting modes of a traffic flow based on a quantum walk, comprising:

(1) constructing a mode generator based on the quantum walk;

(2) preparing multiple modes;

(3) screening the modes; and (4) constructing a mapping mechanism between the modes and the traffic volume.

The present invention mainly comprises the following two theoretical assumptions: (1) a mode assumption: assuming that trajectories formed by drivers with the same/similar driving patterns are aggregated to form a traffic mode, which defines the relation between the heterogeneity of drivers and the mode; and (2) a model assumption: assuming that the traffic flow satisfies the independence assumption and the randomness assumption (the real traffic flow substantially satisfies the assumption), it was determined that all possible traffic modes are generated using quantum walk rather than classical random walk.

Figure 2:
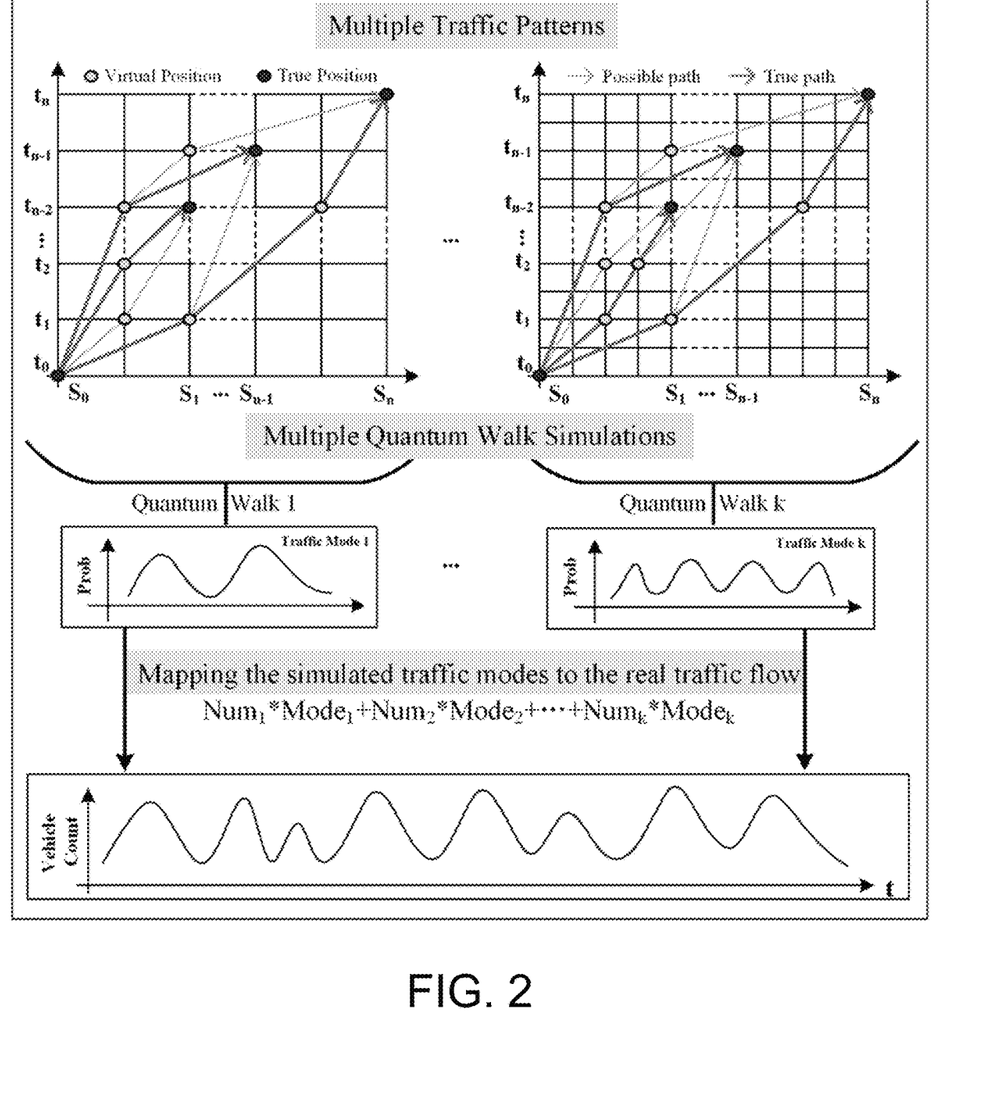
FIG. 2 is a schematic diagram of an overall framework structure according to the present invention.

As shown in FIG. 2, in a one-dimensional expressway traffic flow, it is assumed that drivers in the same mode in the traffic flow drive into the traffic flow from a station $S_0$ at a time point $t_0$ and drive off from a station such as $S_1$, $S_2$, ..., $S_n$. When the system is not observed, any driver appears at any station at any time point with a certain probability, different modes have different probability distributions, and the heterogeneity of drivers is reflected by the probabilities.

In order to establish a method for fitting modes of a traffic flow based on a quantum walk, the present invention follows the following assumptions: (1) an independence assumption: traffic oscillations produced by individuals are correlated, which not only means that the driving pattern of an individual is influenced by other individuals, but also that the driving pattern of an individual interacts with the overall traffic situation; and (2) a randomness assumption: drivers in the same traffic mode are characterized by randomness; even if vehicles run at a constant speed, the drivers may appear at any position within a given time under the condition of no observation implemented, which satisfies the basic assumption of quantum walk. Based on the above assumptions, the feasibility of preparing the traffic mode using the quantum walk is ensured.

To satisfy the basic assumption of quantum walks, drivers with the same/similar driving pattern (i.e., drivers in the same mode) are abstracted as quantized particles, and the movement of such drivers in the expressway traffic system can be described as shifts of the particles between stations. When the system is not observed, the particles may appear at a plurality of possible positions with a certain probability, which forms a dynamic evolution process of the probability of the particles appearing at each station in this mode over time. Therefore, based on the quantum walk and under the constraint of the expressway network topological structure, a probability distribution generator in a single mode is constructed.

The movement of drivers in the same traffic mode in the expressway traffic system can be described as shifts of abstracted walkers between stations, and can be described by the quantum walk. In the process of constructing the mode generator, the key point is that in the case of given parameters, a walker starts from a fixed station and conducts the quantum walk on a basic framework composed of an adjacent matrix (topological structure) of an expressway network in a research area, which forms a dynamic evolution of the distribution probability of vehicles in the single mode over time.

Based on a basic assumption of the quantum walk, all possible selections of a driver are defined as ground states of the quantum walk in a one-dimensional traffic flow with n stations, which are recorded as $|v\rangle=\{|1\rangle, |2\rangle, \ldots, |n\rangle\}$. Since the driver can only select one station to drive off from the expressway traffic flow, the ground states can be expressed as the following vector form:

$$|1\rangle = \begin{pmatrix} 1 \\ 0 \\ \vdots \\ 0 \end{pmatrix}, |2\rangle = \begin{pmatrix} 0 \\ 1 \\ \vdots \\ 0 \end{pmatrix}, \ldots, |n\rangle = \begin{pmatrix} 0 \\ 0 \\ \vdots \\ 1 \end{pmatrix} \quad (1)$$

In order to allow the driver to dynamically adjust the probability of the occurrence in different stations, a Hilbert space H formed by the ground states is defined firstly, so that a superposition state formed by linear combination of the ground states is also in the space. Thus, a state $|\varphi(k)\rangle$ of the quantum walk may be defined as a linear superposition of all the ground states:

$$|\varphi(k)\rangle = \Sigma_{j=1}^{n} a_j(k)|j\rangle \quad (2)$$

wherein $|a_j(k)| \in [0,1]$ represents a probability amplitude of a driver being in a state $|j\rangle$ at a given time. Unlike the classical random walk, the quantum walk is not a Markov chain. According to the randomness assumption, evolution of the state vector $|\varphi(k)\rangle$ over time based on unitary transformation can be represented as follows:

$$\frac{d}{dt}|\varphi(k)\rangle = iA|\varphi(k)\rangle \quad (3)$$

As shown in formula (3), the dynamic evolution of the state vector depends on an adjacent matrix A, and a differential equation comprising complex coefficients is difficult to directly solve. Therefore, the state vector is converted to a matrix from the perspective of a discrete point, and the state vector is effectively solved through matrix operation, thereby constructing the mode generator based on the quantum walk.

In a real expressway traffic flow, the driving patterns of drivers are distinctive, so that it is unrealistic to characterize the expressway traffic flow using a single mode. Therefore, preparation of multiple traffic modes is considered, which can not only reveal a complex structure of the traffic flow and a superposition coupling relation of multiple modes, but also provide a foundation for high-precision fitting of the traffic volume.

A control parameter of the quantum walk is the only parameter of the mode generator constructed in the step (1), which directly determines characteristics of traffic modes, namely structural characteristics of corresponding probability distributions. Therefore, all possible modes in the traffic flow can be generated only by continuously changing the control parameter of quantum walk, and are the "base" for mode decomposition, modeling and simulation of the traffic flow.

In the present invention, the parameter k is continuously adjusted based on the following rule: 2000 quantum walks are performed on the expressway network in the research area, and k is increased from 0.01 to 20 at 0.01 intervals. Finally, all possible traffic modes of 7 stations are generated, and the preparation of multiple modes based on the quantum walk is realized.

Although the expressway traffic flow has complex structures and different modes, the presence of some ideal modes is almost impossible due to such real conditions as speed limit and real-time traffic conditions, and the modes of different types of traffic flows (such as a traffic flow having different passenger-cargo ratios) are completely different. All possible traffic modes generated in the step (2) are only a common mode set and do not have the capacity for describing different types of traffic flow. Therefore, under the constraints of the observed traffic volume, based on the specific mode screening criteria, the real traffic modes in different traffic flows are analyzed to facilitate the subsequent exploration of the multi-mode coupling relationship of traffic flow.

In the present invention, taking a stepwise regression subset screening method as a traffic mode screening method, and under the constraint of a observed traffic volume time series F, stepwise regression subset screening is performed on all the possible traffic modes ($|\varphi(k_1)\rangle, |\varphi(k_2)\rangle, \ldots, |\varphi(k_n)\rangle$) generated in the step (2), and is expressed as follows:

$$F \sim \text{stepwize}(|\varphi(k_n)\rangle) F \sim \text{stepwize}(\Sigma_{n=1}^{N}|\varphi(k_n)\rangle) \quad (4)$$

Based on Akaike information criterion (AIC), all the possible traffic modes ($|\varphi(k_1)\rangle, |\varphi(k_2)\rangle, \ldots, |\varphi(k_n)\rangle$) are screened using the stepwise regression subset screening method in formula (4) to obtain a mode screening result, which is recorded as $\{|\varphi(k_m)\rangle\}$.

In the present invention, the mode represents the probability of drivers in the same/similar driving pattern (i.e., drivers in the same mode) appearing at each station, and a conversion mapping mechanism exists between the probability and the traffic volume. Therefore, based on the screened mode obtained in the step (3), an aliasing coupling relation between the traffic volume and the traffic mode is established, and the mapping conversion from the mode to the traffic volume is realized, thereby achieving the purpose of fitting the traffic volume.

Based on the screened mode $\{|\varphi(k_m)\rangle\}$ obtained in the step (3), an aliasing coupling relation between the traffic volume and the traffic mode is established, and is expressed as follows:

$$F = \Sigma_{m=1}^{M} \alpha_m \times \{|\varphi(k_m)\rangle\} \quad (5)$$

wherein M is a number of the traffic modes obtained by screening in the step (3), F is a observed traffic volume time series, $\alpha_m$ is a total number of vehicles driving off from the expressway traffic flow in the mode $\{|\varphi(k_m)\rangle\}$, and $k_m$ is the parameters of the screened modes and is an important characteristic parameter of the traffic mode characteristics.

The experimental configuration of the present invention comprises two parts: (1) experimental data configuration: traffic volume time series data of 7 typical expressway entry and exit stations (Tangshan station (N1), Jurong station (N2), Heyang station (N3), Danyang station (N4), Luoshuwan station (N5), Xuejia station (N6) and Changzhoubei station (N7)) from Nanjing to Changzhou in Shanghai-Nanjing expressway are selected as the experimental data (the data acquisition frequency/time window is 10 minutes); and (2) comparative experiment configuration: an Autoregressive Integrated Moving Average model (ARIMA) and a Long Short-Term Memory (LSTM) network are selected as comparison models, and corresponding comparison indexes are defined to evaluate the modeling effect.

Based on the above experimental configurations, the results of the present invention are divided into the following two parts: (1) a modeling result of a traffic mode fitting method based on a quantum walk; and (2) comparison and verification of modeling results of different models.

In the preparation of multiple modes, 2000 quantum walks are performed on the expressway network in the research area, and a parameter of the quantum walks is increased from 0.01 to 20 at 0.01 intervals. Meanwhile, an Autoregressive Integrated Moving Average model (ARIMA) and a Long Short-Term Memory (LSTM) network are selected as comparative models. In order to evaluate the modeling effect, the mean absolute error (MAE), the root mean square error (RMSE) and the coefficient of determination ($R^2$) are selected for measuring the fitting effect of models. The specific definitions are shown in Table 1, in which $y_i$ is an observed expressway traffic volume; $\bar{y}_i$ is an average traffic volume; $\hat{y}_i$ is the simulated traffic volume; m is a number of fitting samples.

TABLE 1

Definitions of evaluation indexes for modeling effect

| Evaluation index | Formula definition |
| --- | --- |
| Mean absolute error (MAE) | $MAE = \frac{1}{m}\sum_{i=1}^{m}|y_i - \hat{y}_i|$ |
| Root mean square error (RMSE) | $RMSE = \sqrt{\frac{1}{m}\sum_{i=1}^{m}(y_i - \hat{y}_i)^2}$ |
| Coefficient of determination ($R^2$) | $R^2 = 1 - \frac{1}{m}\sum_{i=1}^{m}|y_i - \hat{y}_i|^2 / \sum_{i=1}^{m}|y_i - \bar{y}_i|^2$ |

The traffic volume time series with time window of 10 minutes is selected as experimental data to complete the mode fitting experiment of the traffic flow. The number of traffic modes of each station and corresponding statistics (Table 2) show that the number of traffic modes of the seven stations are between 54 (N4) and 167 (N7), which indicates that the traffic flow from Nanjing to Changzhou in Shanghai-Nanjing expressway is complex in mode structure and has complex multi-scale oscillations. The average simulation precision ($R^2$) of the seven stations is 0.80, which indicates that the method for fitting modes of a traffic flow based on a quantum walk has higher simulation accuracy and can reconstruct and invert stochastic oscillations of different frequency components of traffic volume. The N1 station has the largest vehicle flow among the seven stations, the ranges of MAE and RMSE are 4-5, and the ranges of MAE and RMSE of other stations are less than 2.5, which indicates that the method for fitting modes of a traffic flow based on a quantum walk generally has low simulation errors of the traffic flows of different scales, can capture the structural characteristics of the traffic volume, and has higher simulation accuracy.

TABLE 2

Number of traffic modes of each station and statistics

| Station | Number of traffic modes | MAE | RMSE | $R^2$ |
| --- | --- | --- | --- | --- |
| N1 | 82 | 4.43 | 5.73 | 0.86 |
| N2 | 94 | 0.61 | 0.80 | 0.74 |
| N3 | 142 | 0.74 | 1.00 | 0.86 |
| N4 | 54 | 1.71 | 2.25 | 0.74 |
| N5 | 85 | 0.55 | 0.73 | 0.67 |
| N6 | 117 | 1.14 | 1.44 | 0.85 |
| N7 | 167 | 0.53 | 0.69 | 0.88 |

Figure 3:
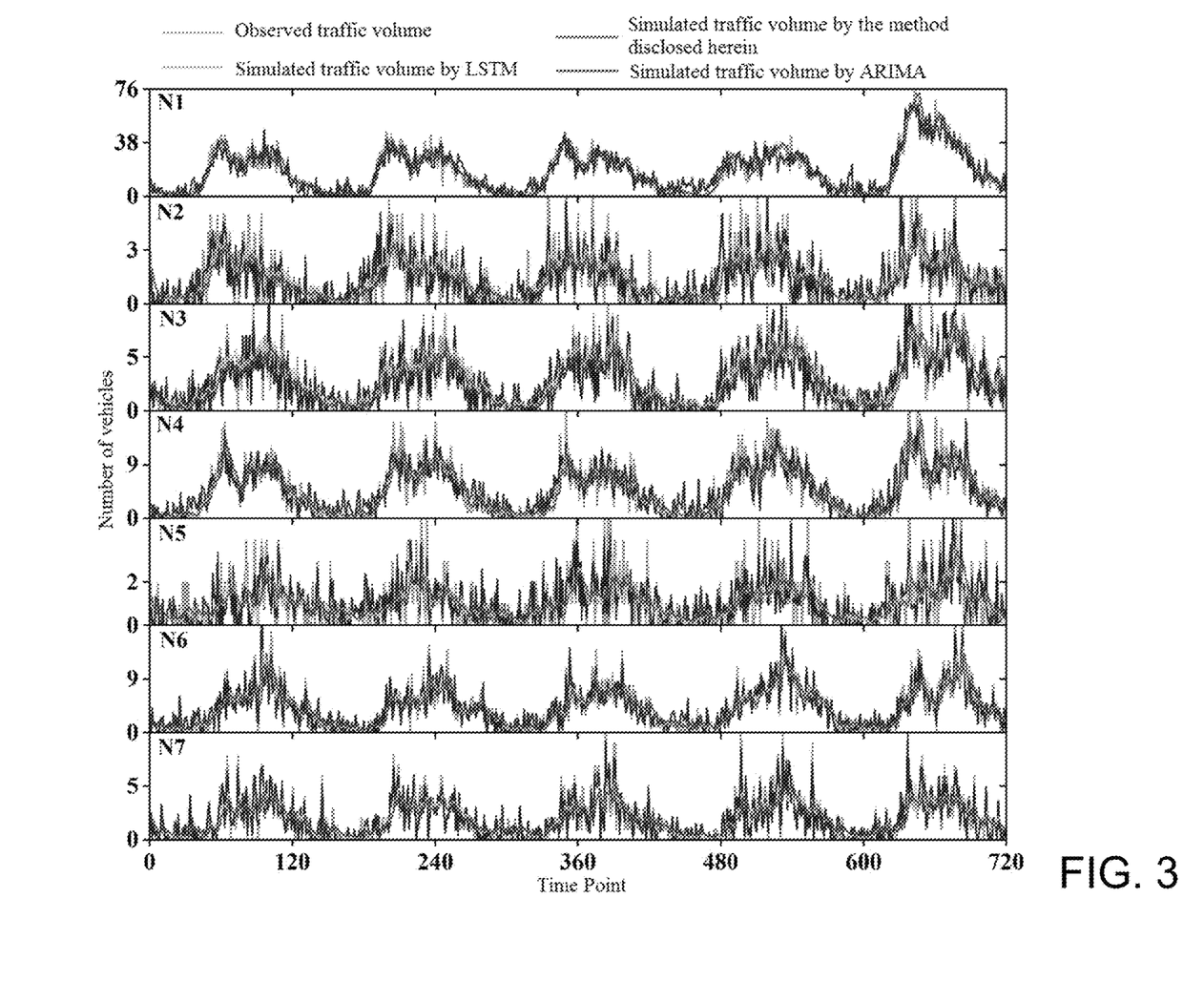
FIG. 3 is a schematic diagram showing simulation results of the three methods according to the present invention.

The comparison of modeling results of the method for fitting modes of a traffic flow based on a quantum walk and ARIMA and LSTM models is shown in FIG. 3. The traffic volume time series is formed by aliasing and combination of a plurality of quasi-periodic fluctuations on a global time scale, and presents severe fluctuations on a small-time scale. On a large-time scale, all the three methods can reflect the overall fluctuation trend and the structural characteristics of the traffic volume. On a small-time scale (local structure), the method for fitting modes of a traffic flow based on a quantum walk can simulate high-frequency oscillation therein with high simulation accuracy, and has strong capturing capability for peaks, valleys and abrupt changes, while ARIMA and LSTM are slightly insufficient in this respect.

Figure 4:
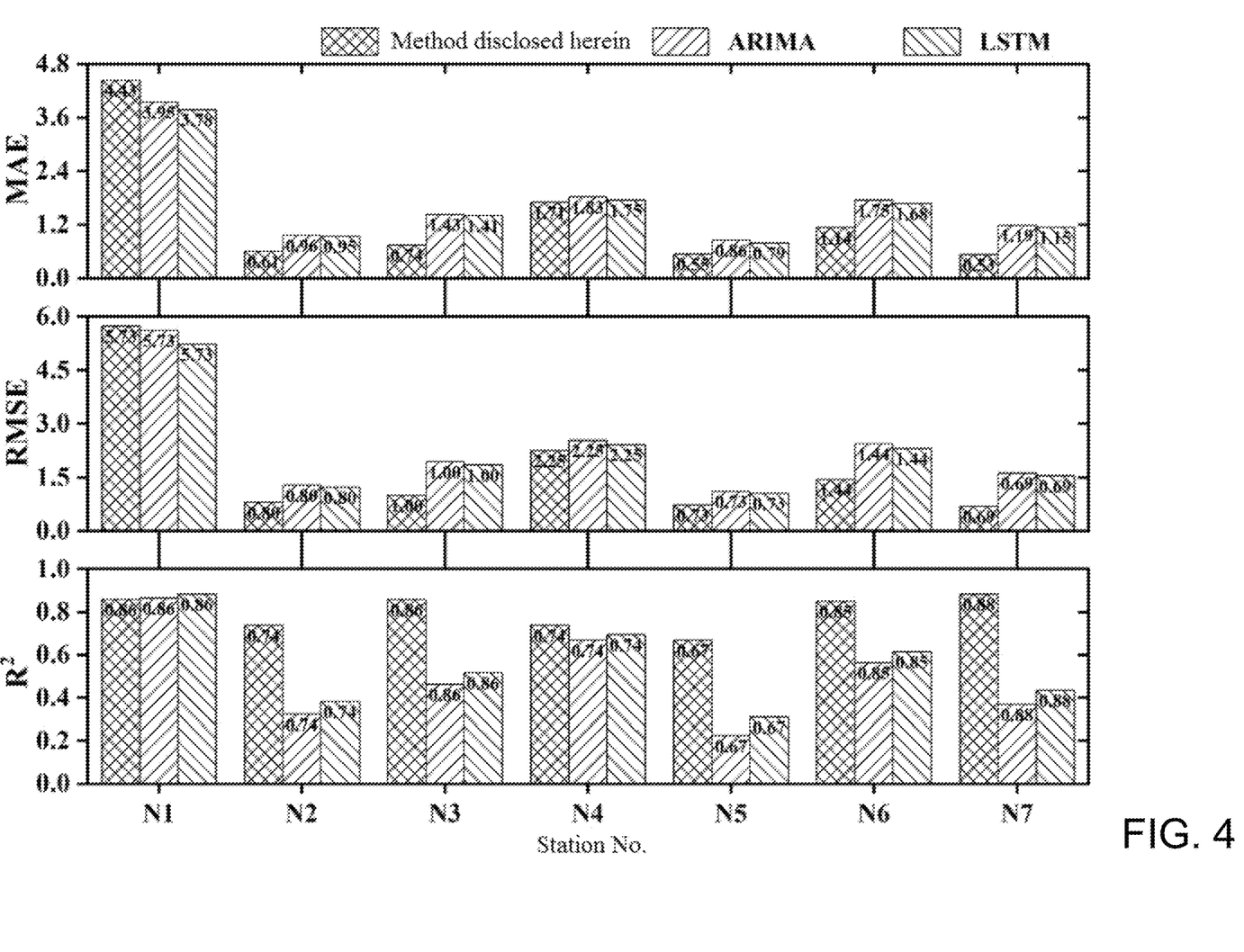
FIG. 4 is a schematic diagram showing comparison of statistical indicators of the three methods according to the present invention.

As shown in FIG. 4, the statistical indexes of the simulation results show that, except for N1 station, the simulation accuracy ($R^2$) of the method for fitting modes of a traffic flow based on a quantum walk for the traffic flows at six other stations is higher than that of the comparative model. The simulation accuracy for the N7 station is the highest among the seven stations, which is 0.88. Compared with ARIMA and LSTM, MAE of the method for fitting modes of a traffic flow based on a quantum walk is reduced by 18.81% and 15.52%, respectively, RMSE is reduced by 23.6% and 19.14%, respectively, and the modeling accuracy ($R^2$) is improved by 60.93% and 45.93%, respectively. The comparison of different models further verifies the excellent performance and stability of the method for fitting modes of a traffic flow based on a quantum walk in traffic modeling and simulation.

Figure 5:
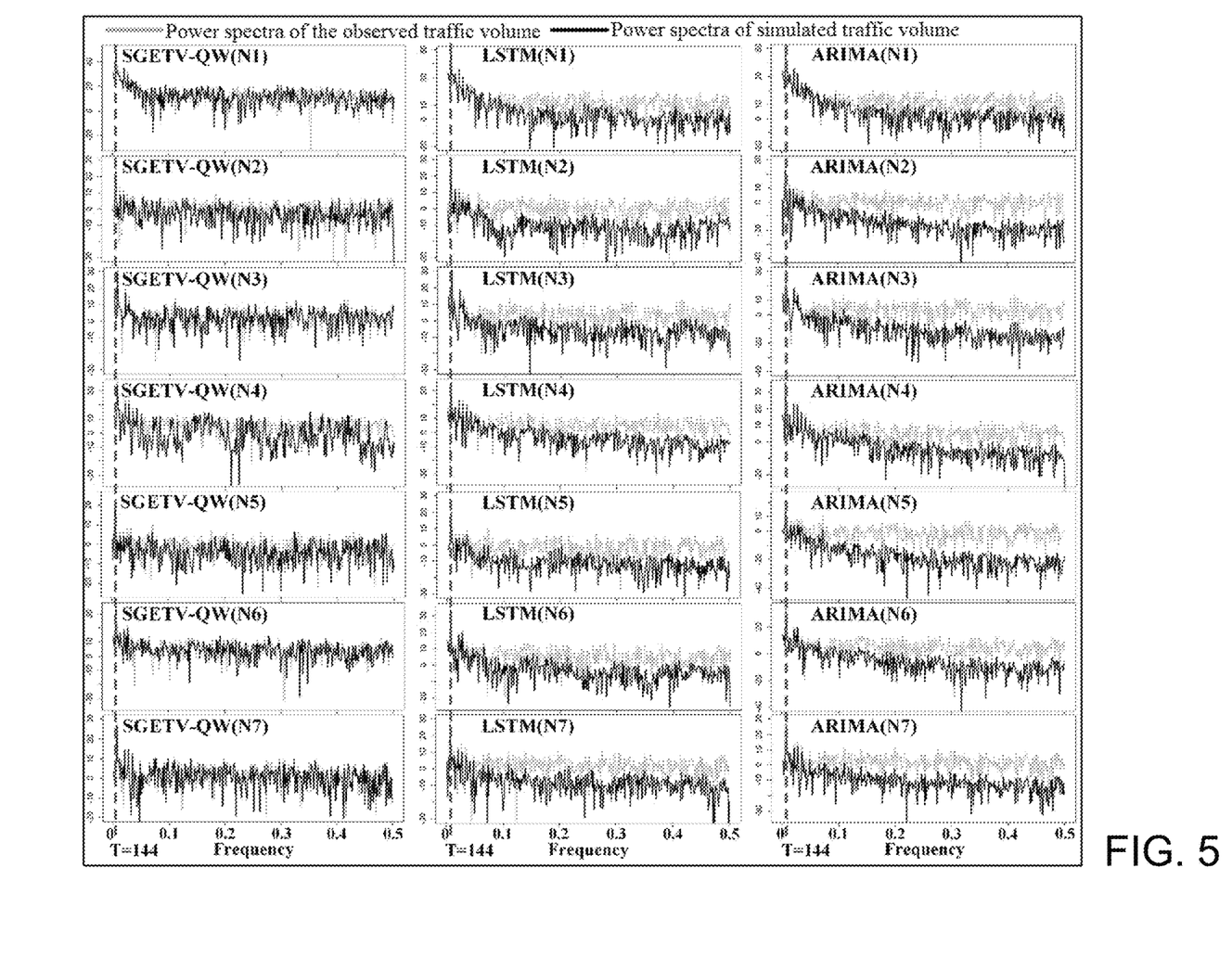
FIG. 5 is a schematic diagram showing comparison of power spectrum analysis results of the three methods according to the present invention.

In addition, the capabilities of the three methods for reconstruction and inversion of traffic flow oscillations with different frequencies are verified from a frequency domain analysis view, and the simulation results of the three methods and power spectrum analysis results of the observed traffic volume time series are shown in FIG. 5. In a low-frequency part, the simulation results of the three methods are consistent with spectral analysis curves of the observed traffic volume time series, which can reveal the low-frequency oscillation of the traffic flow. In a high-frequency part, a simulation result of the method for fitting modes of a traffic flow based on a quantum walk is almost consistent with spectral analysis curves of the observed traffic volume time series, while the results of LSTM and ARIMA have great difference, which indicates that the method for fitting modes of a traffic flow based on a quantum walk can simulate the high-frequency oscillation of the traffic flow and has the advantage of revealing the complex structural characteristics of the traffic flow.

What is claimed is:

1. A method for fitting traffic modes of a traffic flow based on a quantum walk, comprising:
   (1) constructing a traffic mode generator based on the quantum walk;
   (2) preparing multiple traffic modes;
   (3) screening the traffic modes; and
   (4) constructing a mapping mechanism between the traffic modes and the traffic volume,
   (5) configuring an expressway traffic simulation base on the mapping mechanism between the traffic mode and the traffic volume; and identifying traffic congestion, diversion and post-process of traffic accidents base on a result of the traffic simulation for future traffic management,
   wherein the screening the traffic modes in the step (3) is specifically as follows: taking a stepwise regression subset screening method as a traffic mode screening method, and under the constraint of observed traffic volume time series F, stepwise regression subset screening is performed on all possible traffic modes ($|\varphi(k_1)\rangle$, $|\varphi(k_2)\rangle$, ..., $|\varphi(k_n)\rangle$) generated in the step (2), and is expressed as follows:

$$F \sim \text{stepwize}(|\varphi(k_n)\rangle) \tag{4}$$

based on Akaike information criterion, all the possible traffic modes ($|\varphi(k_1)\rangle$, $|\varphi(k_2)\rangle$, ..., $|\varphi(k_n)\rangle$) are screened using the stepwise regression subset screening method in formula (4) to obtain a traffic mode screening result, which is recorded as $\{|\varphi(k_m)\rangle\}$.

2. The method according to claim 1, wherein the constructing the traffic mode generator based on the quantum walk in the step (1) is specifically as follows: based on a basic assumption of the quantum walk, all possible selections of a driver are defined as ground states of the quantum walk in a one-dimensional traffic flow with n stations, which are recorded as $|v\rangle = \{|1\rangle, |2\rangle, \ldots, |n\rangle\}$; since the driver can only select one station to drive off from the expressway traffic flow, the ground states are expressed as the following vector form:

$$|1\rangle = \begin{pmatrix} 1 \\ 0 \\ \vdots \\ 0 \end{pmatrix}, |2\rangle = \begin{pmatrix} 0 \\ 1 \\ \vdots \\ 0 \end{pmatrix}, \ldots, |n\rangle = \begin{pmatrix} 0 \\ 0 \\ \vdots \\ 1 \end{pmatrix} \tag{1}$$

in order to allow the driver to dynamically adjust a probability of an occurrence in different stations, a Hilbert space H formed by the ground states is defined firstly, so that a superposition state formed by linear combination of the ground states is also in the space; thus, a state of the quantum walk $|\varphi(k)\rangle$ is defined as a linear superposition of all the ground states:

$$|\varphi(k)\rangle = \Sigma_{j=1}^{n} a_j(k)|j\rangle \tag{2}$$

wherein $|a_j(k)| \in [0,1]$ represents a probability amplitude of a driver being in a state $|j\rangle$ at a given time; according to randomness assumption, evolution of the state vector $|\varphi(k)\rangle$ over time based on unitary transformation is represented as follows:

$$\frac{d}{dt}|\varphi(k)\rangle = iA|\varphi(k)\rangle \tag{3}$$

wherein i in formula (3) is a square root of a number "-1"

as shown in formula (3), the dynamic evolution of the state vector depends on an adjacent matrix A, the state vector is converted to a matrix from a discrete point view, and the state vector is effectively solved through matrix operation, thereby constructing the traffic mode generator based on the quantum walk.

3. The method according to claim 1, wherein the preparing multiple traffic modes in the step (2) is specifically as follows: a control parameter of the quantum walk is the only parameter of the traffic mode generator constructed in the step (1), which directly determines characteristics of traffic modes, namely structural characteristics of corresponding probability distribution; all possible traffic modes in the traffic flow can be generated only by continuously changing the control parameter of the quantum walk.

4. The method according to claim 1, wherein the constructing a mapping mechanism between the traffic modes and the traffic volume in the step (4) is specifically as follows: based on the screened traffic mode ($\{|\varphi(k_m)\rangle\}$) obtainded in the step (3), an aliasing coupling relation between the traffic volume and the traffic modes is established, and is expressed as follows:

$$F = \Sigma_{m=1}^{M} \alpha_m \times \{|\varphi(k_m)\rangle\} \tag{5}$$

wherein M is a number of the traffic modes obtained by screening in the step (3), F is observed traffic volume time series, $\alpha_m$ is a total number of vehicles driving off from the expressway traffic flow in the traffic mode $\{|\varphi(k_m)\rangle\}$, and $k_m$ is the parameters of the screened traffic modes and is an important characteristic parameter of the traffic mode characteristics.

* * * * *